US011897400B2

United States Patent
Sindel et al.

(10) Patent No.: US 11,897,400 B2
(45) Date of Patent: Feb. 13, 2024

(54) SUPPORT DEVICE FOR A WATER-COLLECTING STRIP

(71) Applicant: ILLINOIS TOOL WORKS INC., Glenview, IL (US)

(72) Inventors: Melanie Sindel, Nuremberg (DE); Jan Müller, Würzburg (DE); Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 20 days.

(21) Appl. No.: 17/686,491

(22) Filed: Mar. 4, 2022

(65) Prior Publication Data

US 2022/0281394 A1 Sep. 8, 2022

(30) Foreign Application Priority Data

Mar. 5, 2021 (DE) ...................... 10 2021 105 349.8
Feb. 24, 2022 (DE) ...................... 10 2022 104 480.7

(51) Int. Cl.
*B60R 13/07* (2006.01)

(52) U.S. Cl.
CPC .................................. *B60R 13/07* (2013.01)

(58) Field of Classification Search
CPC ... F16B 5/12; B60R 13/06; B60J 10/25; B60J 10/70
USPC .................................................... 296/180.1
See application file for complete search history.

(56) References Cited

U.S. PATENT DOCUMENTS

| 5,118,157 | A | * | 6/1992 | Tamura | B60J 10/80 296/180.5 |
| 6,899,376 | B1 | * | 5/2005 | Sullivan | B62D 35/001 296/180.1 |
| 9,840,287 | B1 | * | 12/2017 | Mayville | B60J 1/02 |
| 10,173,510 | B2 | * | 1/2019 | Vojtisek | B60J 10/50 |
| 10,183,635 | B2 | * | 1/2019 | Tsutsumi | B60J 1/02 |
| 10,597,088 | B2 | * | 3/2020 | Gulker | B60R 13/07 |
| 11,485,430 | B2 | * | 11/2022 | Watanabe | B62D 25/12 |
| 2014/0306480 | A1 | * | 10/2014 | Sasaki | B60J 10/70 296/93 |

FOREIGN PATENT DOCUMENTS

| DE | 3600504 A1 | 7/1987 | |
| EP | 582499 A1 * | 2/1994 | ............. B60J 10/30 |

* cited by examiner

*Primary Examiner* — Amy R Weisberg
*Assistant Examiner* — Sara Laghlam
(74) *Attorney, Agent, or Firm* — THOMPSON HINE LLP

(57) ABSTRACT

A carrier apparatus (mount) for fastening a water-collecting strip to an A-pillar of a motor vehicle includes a fastening wall having a fastening side and a receiving side, wherein at least one catching device is arranged on the fastening side of the fastening wall for connecting with the A-pillar, which catching device extends in an approximately orthogonal direction from the fastening side, and wherein the catching device is formed for insertion and rearward catching in a through-opening of the A-pillar, and a catching element device arranged opposite the receiving side having at least one catching element for releasably fixing a water-collecting strip in a receiving region, wherein the receiving region is formed between the receiving side of the fastening wall and the catching element.

9 Claims, 6 Drawing Sheets

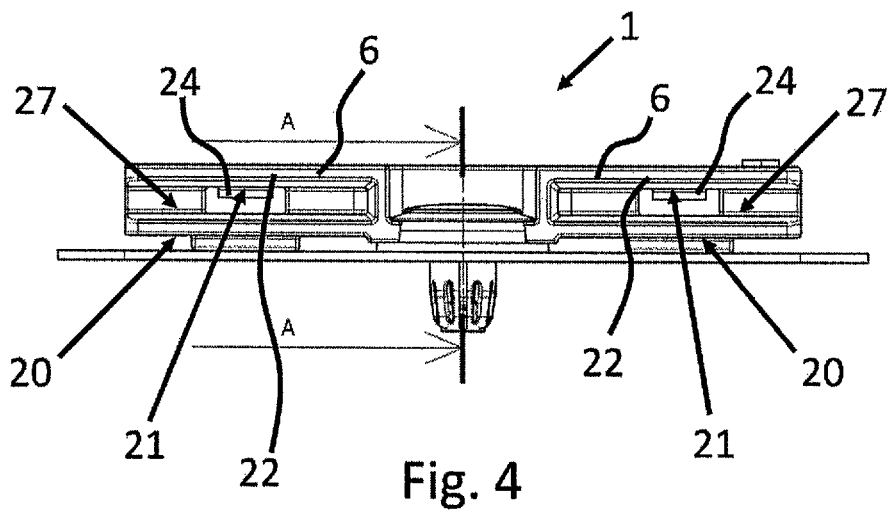
Fig. 4
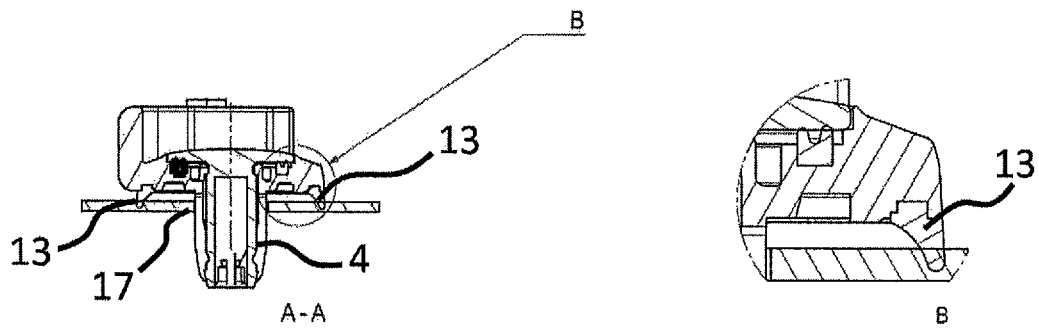
Fig. 5
Fig. 6
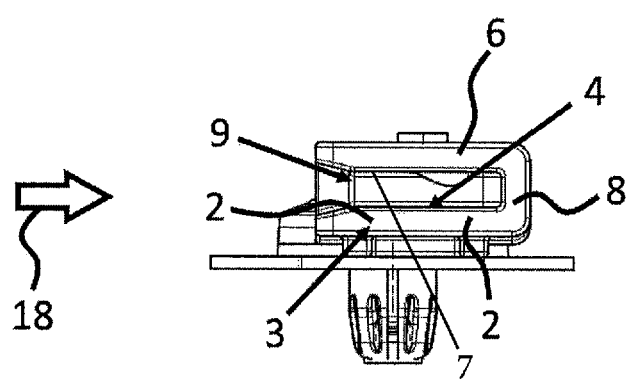
Fig. 7

SUPPORT DEVICE FOR A WATER-COLLECTING STRIP

TECHNICAL FIELD

The present invention relates to a carrier apparatus for a water-collecting strip, an assembly comprising such a carrier apparatus and a water-collecting strip, and a method for mounting a water-collecting strip.

BACKGROUND

Water-collecting strips are used in order to controllably discharge rainwater falling on the windshield over the roof or engine compartment and cover the transition from the windshield to the A-pillar. Water turbulence in the field of view of the side window and the side rear view mirror is thereby reduced.

In a motor vehicle, a substantial part of the water that hits the windshield, namely either rainwater or dirty water that is lifted from the road, is driven toward the sides of the automobile due to the curvature of the windshield, wherein the main part of this water is directed upwards onto the roof of the automobile by the water-collecting strip fastened to the windshield pillar, so that a dirtying of the side windows is greatly reduced.

In DE 3 600 504 A1, such a water-collecting strip is described.

Water-collecting strips are fastened via mounts or carrier apparatuses to an A-pillar of a motor vehicle.

SUMMARY

The problem addressed by the present invention is to provide a carrier apparatus for a water-collecting strip that is an alternative to the carrier apparatuses for water-collecting strips known from the prior art.

A further problem addressed by the present invention is to provide a carrier apparatus for a water-collecting strip that simplifies a mounting process of the carrier apparatus and/or a water-collecting strip and is safe and reliable in operation.

In addition, a problem addressed by the present invention is to provide a carrier apparatus for a water-collecting strip that is easy and inexpensive to produce.

Furthermore, a problem addressed by the present invention is to provide an assembly comprising a water-collecting strip and at least one carrier apparatus, as well as a method for mounting a water-collecting strip, which together form an alternative to the prior art, are easily constructed, and are safe and reliable in operation.

According to the invention, a carrier apparatus (mount) for fastening a water-collecting strip to an A-pillar of a motor vehicle is provided. This comprises a fastening wall having a fastening side and a receiving side, wherein at least one catching means is arranged on the fastening side of the fastening wall [for] connecting with an A-pillar of a motor vehicle, which catching means extends in an approximately orthogonal direction from the fastening side, and wherein the catching means is formed for insertion and rearward catching in a through-opening of an A-pillar of a motor vehicle, and a catching element device arranged opposite the receiving side having at least one catching element for releasably fixing a water-collecting strip in a receiving region, wherein the receiving region is formed between the receiving side of the fastening wall and the catching element.

The catching means arranged on the fastening side of the fastening wall can be configured in order to releasably connect with an A-pillar of a motor vehicle, e.g. as an expanding rivet.

Carrier apparatuses or mounts known from the prior art for fastening a water-collecting strip to an A-pillar of a motor vehicle are connected, for example, to a mushroom-shaped fastening pin formed on an A-pillar via a clamping connection. Also known are carrier apparatuses for water-collecting strips that are connected to an A-pillar of a motor vehicle by means of a weld connection, an adhesive connection, a rivet connection, or a clinch connection.

In all of these connections, either the carrier apparatuses themselves are relatively complicated in construction, or a connection process or method for the mounting of a carrier apparatus and a water-collecting strip requires considerable technical effort.

None of these known water-collecting strips have, for the purposes of fastening, catching means for the insertion and rearward catching in a through-opening of an A-pillar of a motor vehicle.

Such a configuration of the catching means for insertion and rearward catching in a through-opening of an A-pillar of a motor vehicle allows for easy mounting and, if necessary, dismounting of the carrier apparatus. In addition, only low mounting forces are required. In particular, a repeatable, releasable connection of one and the same carrier apparatus to an A-pillar is also possible.

The carrier apparatus according to the invention can be easily mounted via the corresponding catching means through the application of a pressure force acting in an axial direction of the catching means or in the mounting direction with a low amount of effort.

In the context of the present invention, a mounting direction is understood to mean a direction in which the carrier apparatus can be connected to an A-pillar, wherein the mounting direction extends orthogonally to an A-pillar in the direction of the A-pillar or in the axial direction of the catching means.

In the context of the present invention, catching means are understood to mean fastening means having elastically deformable catching arms with corresponding catching edges or catching tabs for rearwardly engaging with a through-opening of a carrier component. Expanding rivets are also considered to be corresponding catching means in the context of the present invention.

A water-collecting strip can be easily mounted by lateral insertion into the receiving region of the carrier apparatus and, in doing so, is secured by at least one catching element. Simple mounting and dismounting is also possible here.

Due to the easy construction, the apparatus according to the invention, which is preferably producible inexpensively from a plastic by means of an injection-molding process, is safe and reliable in operation.

The catching element can comprise a fixing wall portion, wherein a catching edge is formed at the free end of the catching element, and wherein the fixing wall portion is arranged spaced apart approximately parallel to the fastening wall approximately parallel thereto such that the fixing wall portion and the receiving side bound the receiving region.

The catching element or its fixing wall portion can act as a catching arm or form a catching arm, wherein the catching edge is configured in order to rearwardly engage with a recess or a through-opening of a water-collecting strip.

The fixing wall portion extends approximately parallel to the fastening wall and thereby allows a water-collecting strip to be held in the mounted state from both the fastening wall as well as from the fixing wall portion on two opposite sides of the water-collecting strip.

In addition, the fastening wall and the fixing wall portion allow a guiding and exact positioning of a water-collecting strip upon insertion into a receiving region of the carrier apparatus according to the invention.

The fastening wall can comprise two catching means, and the catching element device comprises two or three catching elements, wherein the catching means and the catching elements are arranged offset from one another along a longitudinal direction of the fastening wall.

The fact that the catching means and the catching elements are arranged offset from one another along a longitudinal direction of the fastening wall means that the catching means and the catching elements are also arranged offset from one another orthogonally with respect to the mounting direction.

In this way, a flat construction of the carrier apparatus is enabled, as the catching elements and the catching means are arranged offset from one another.

In addition, the regions in which retention forces act, for example between a catching means and an A-pillar as well as between a catching element and a water-collecting strip, [and the regions] in which higher mechanical forces occur are decoupled from one another so that the carrier apparatus can be stably formed without great material thicknesses.

The provision of two catching means and two or three catching elements allows for higher retention forces and a safe and reliable retention of a water-collecting strip.

Two of the catching elements of the catching element device can comprise the aforementioned fixing wall portions and corresponding catching edges. With respect to the receiving region, the third catching element can be arranged opposite the other two catching elements, wherein a corresponding portion of the catching arm of the catching element facing in the direction of the receiving region forms a receiving side portion. At the free end of this catching element, a catching edge is also formed. The receiving side portion thus forms a catching arm of the catching element having a corresponding catching edge at the free end.

In this way, a water-collecting strip can be retained from both sides, which allows for a safer connection of the water-collecting strip to the carrier and also increases the retention forces.

Due to the fact that a catching arm of a catching element forms a receiving side portion arranged in the longitudinal direction of the fastening wall flush with the receiving side, a water-collecting strip is safely guided and positioned upon insertion into the carrier apparatus, as well as in a corresponding final mounting position, because the water-collecting strip then abuts both the receiving side of the fastening wall, the receiving side portion of a catching element, and the two fixing wall portions of the other two catching elements and is positioned and guided by them.

Such a configuration results in the synergistic effect that, on the one hand, the catching elements are configured in order to retain and fix a water-collecting strip and, on the other hand, a water-collecting strip is retained precisely in position by the fixing wall portions or the fixing side portions and/or the receiving side portions of the catching arms of the catching elements and safely guided and positioned upon insertion into the receiving space. This allows for improved and more accurate positioning of a water-collecting strip.

Further, the carrier apparatus can comprise a fastening wall having a fastening side and a receiving side, wherein at least one and preferably two catching means are arranged on the fastening side of the fastening wall for connecting with an A-pillar of a motor vehicle, which catching means extend in an approximately orthogonal direction from the fastening side, and a fixing wall having a fixing side, wherein the fixing wall is arranged spaced apart approximately parallel to the fastening wall, and wherein the receiving side of the fastening wall and the fixing side of the fixing wall bound a receiving region for a water-collecting strip, and wherein at least one catching element extending into the receiving region is arranged on the fixing wall for releasably fixing a water-collecting strip in the receiving region.

When a fastening wall having two catching means for connecting with an A-pillar of a motor vehicle is provided in the carrier apparatus according to the invention, the carrier apparatus can be easily clipped into corresponding fastening openings of an A-pillar of a motor vehicle.

By providing two catching means, the carrier apparatus can be arranged in an anti-rotational manner on an A-pillar of a motor vehicle. In addition, the two catching means also cause the carrier apparatus to be correctly positioned.

This results in a safe and reliable arrangement of the carrier apparatus and thus also of a water-collecting strip connected to the carrier apparatus on an A-pillar of a motor vehicle.

Two adjacent edges of the fastening wall and/or the receiving side portion of the catching element and the fixing wall and/or the fixing wall portion of the catching element can be connected to one another via a connecting wall, wherein the connecting wall is arranged orthogonally to the fastening wall and the fixing wall, and wherein a receiving opening is formed by the free edges of the fastening wall and the fixing wall lying opposite the connecting wall.

A water-collecting strip can be inserted into the receiving region in an insertion direction extending orthogonally to the connecting wall via the receiving opening.

Such a structural configuration of the carrier wall allows for a water-collecting strip to be easily inserted into the carrier device.

The catching element can be inclined from the fixing side of the fixing wall approximately at a 45° angle to the insertion direction, so that the catching element is formed in such a way that a lower force can be applied when fixing a water-collecting strip in the receiving region than when the water-collecting strip is released from the receiving region.

This means that extremely low mounting forces are required in order to assemble a water-collecting strip in the carrier apparatus according to the invention, which significantly simplifies mounting and can also be carried out safely and reliably as a result.

Furthermore, dismounting forces of 70 N to 160 N are necessary for dismounting or releasing a water-collecting strip from the receiving region of the carrier apparatus. In this way, a water-collecting strip can be reliably mounted on an A-pillar of a motor vehicle, because it is ensured that the water-collecting strip will not accidentally detach from the carrier apparatus, and it is thus securely held in place. Nevertheless, the water-collecting strip can be dismounted with a predetermined force.

Preferably, two identical catching elements are arranged for fixing a water-collecting strip on the fixing side of the fixing wall.

By providing two identical catching elements, a water-collecting strip can be fixed in place in a receiving region of the carrier apparatus.

In addition, the two catching elements help to ensure that the water-collecting strip is correctly positioned or assumes a predetermined mounting position with respect to the carrier apparatus and thus also with respect to an A-pillar of a motor vehicle.

The catching means can comprise a radially circumferential sealing element for sealingly connecting the carrier apparatus to an A-pillar of a motor vehicle, wherein the sealing element is preferably produced by means of a 2-component injection-molding process and connected to the catching means.

By providing a corresponding sealing element on the catching means, a sealing connection between the carrier apparatus and an A-pillar of a motor vehicle is ensured.

The sealing element can be easily formed or produced together with the carrier apparatus by means of a 2-component injection-molding method and thus chemically connected to the catching means in the same working step.

The carrier apparatus basically comprises a fastening wall and a fixing wall. The fastening wall and the fixing wall can be formed as continuous walls or as partial walls. These wall portions are referred to as fastening wall portions and fixing wall portions.

The fastening wall is approximately plate-shaped and comprises a fastening side and a receiving side. The receiving side faces in the direction of the receiving region. Insofar as the fastening wall comprises two or more fastening wall portions, each of these comprise a fastening side portion and a receiving side portion.

The fixing wall is approximately plate-shaped and is arranged approximately parallel to the fastening wall. The fixing wall comprises a fixing side which faces in the direction of the receiving region. Insofar as the fixing wall comprises two or more fixing wall portions, each of these comprise a fixing side portion.

One or more fixing wall portions can be formed separately and/or by the surfaces of the catching arms of the catching elements facing in the direction of the receiving region.

One or more fastening wall portions can be formed separately and/or by the surfaces of the catching arms of the catching elements facing in the direction of the receiving region.

The water-collecting strip is guided and positioned via the fixing side of the fixing wall or the fixing side portions of the fixing wall portions and the receiving side of the fastening wall or the receiving side portions of the fastening wall portions, respectively, upon insertion of a water-collecting strip into the receiving region. In the mounted state, a surface of the water-collecting strip abuts the fixing side of the fixing wall or the fixing side portions of the fixing wall portions and is positioned and retained by them.

Adjacent edges of the fastening wall or fastening wall portions and the fixing wall or fixing wall portions can be connected to one another via a connecting wall. The connecting wall is arranged approximately orthogonally to the fastening wall or fastening wall portions and the fixing wall or fixing wall portions.

The free edges of the fastening wall or fastening wall portions and the fixing wall or fixing wall portions lying opposite the connecting wall form a receiving opening.

A water-collecting strip is insertable into the receiving region of the carrier apparatus via an insertion direction extending approximately orthogonal to the connecting wall.

The receiving region is bounded by the fastening wall or fastening wall portions, the connecting wall or connecting wall portions, and the fixing wall.

The technical features described above can be combined as desired with one another, insofar as technically possible.

Furthermore, according to the present invention, an assembly comprising a carrier apparatus described above and a water-collecting strip arranged and fixed in a receiving region of the carrier apparatus is provided.

The water-collecting strip can comprise a catching recess that is configured in order to correspond to a catching element of the carrier apparatus.

The advantage of such an assembly is that it can be easily pre-mounted and is then mountable as a complete assembly on an A-pillar of a motor vehicle.

Preferably, a plurality of carrier apparatuses, for example at least two or three or a maximum of seven or six or five or four and in particular three to 5, are provided per A-pillar in order to form the assembly.

In addition, a method for mounting a water-collecting strip on an A-pillar of a motor vehicle is provided, wherein a carrier apparatus is first releasably connected to an A-pillar of a motor vehicle by means of one and preferably by means of two catching means, which are inserted into and rearwardly catch in corresponding fastening openings (through-openings) of an A-pillar. This process is repeated until all of the carrier apparatuses used are fastened to an A-pillar. Subsequently, a water-collecting strip is inserted into receiving regions of the aforementioned carrier apparatus and fixed by means of corresponding catching means.

By means of the method according to the invention, an easy, safe, and reliable mounting of a carrier apparatus or three carrier apparatuses and the water-collecting strip on an A-pillar of a motor vehicle is possible.

The advantages of the assembly according to the invention and the method according to the invention correspond analogously to the advantages described above with respect to the carrier apparatus.

BRIEF DESCRIPTION OF THE DRAWINGS

The present invention will now be described in more detail on the basis of two exemplary embodiments shown in the figures. The figures show:

FIG. 4 a lateral view of the carrier apparatus from FIG. 2;

FIG. 5 a laterally cut view from FIG. 4, cut along the line A-A;

FIG. 6 a detail view of a sealing device of a catching means of the carrier apparatus from FIG. 5;

FIG. 7 a lateral view of the carrier apparatus;

DETAILED DESCRIPTION

Figure 1:
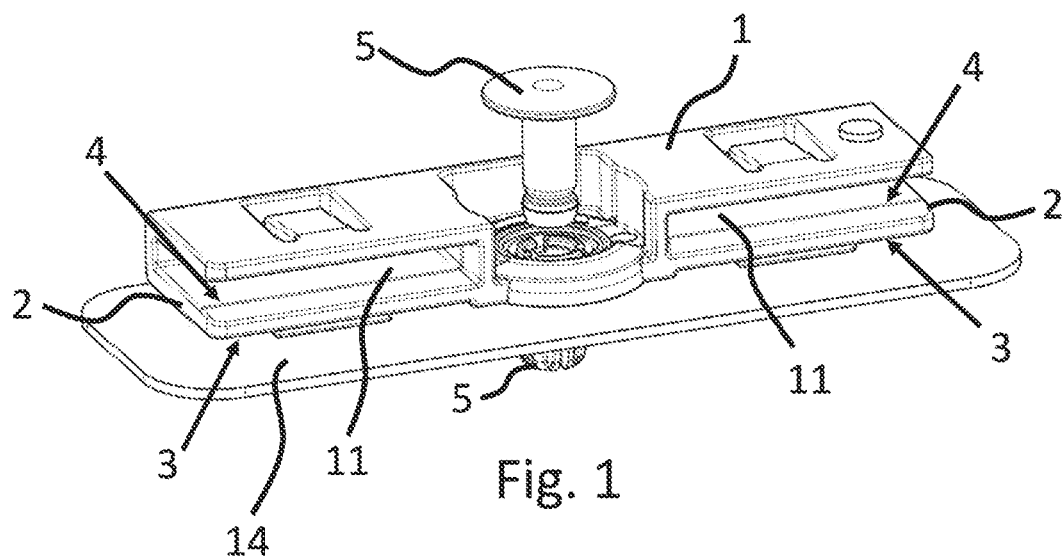
FIG. 1 a perspective view of a carrier apparatus according to the invention with a portion of an A-pillar in the unfastened state according to a first exemplary embodiment.
Figure 2:
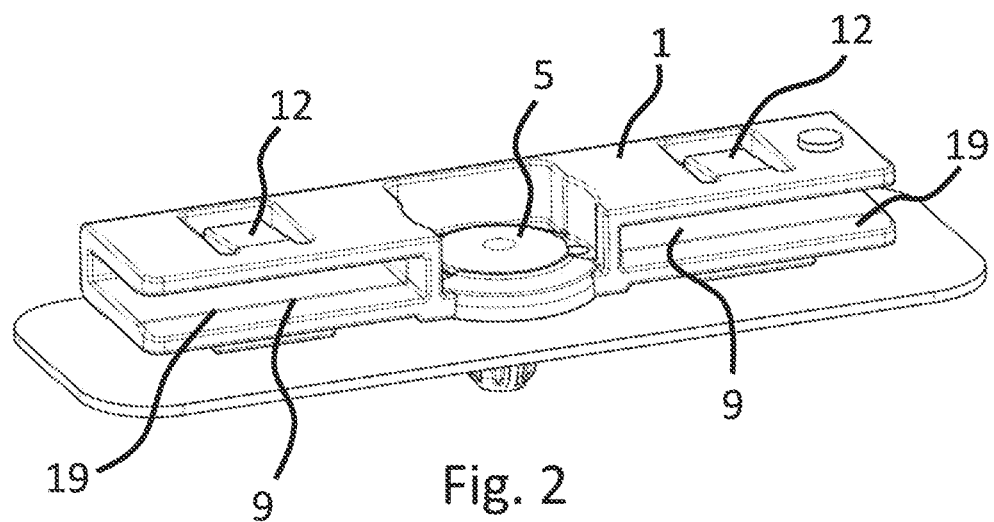
FIG. 2 the view from FIG. 1 in a state when fastened to the A-pillar.
Figure 3:
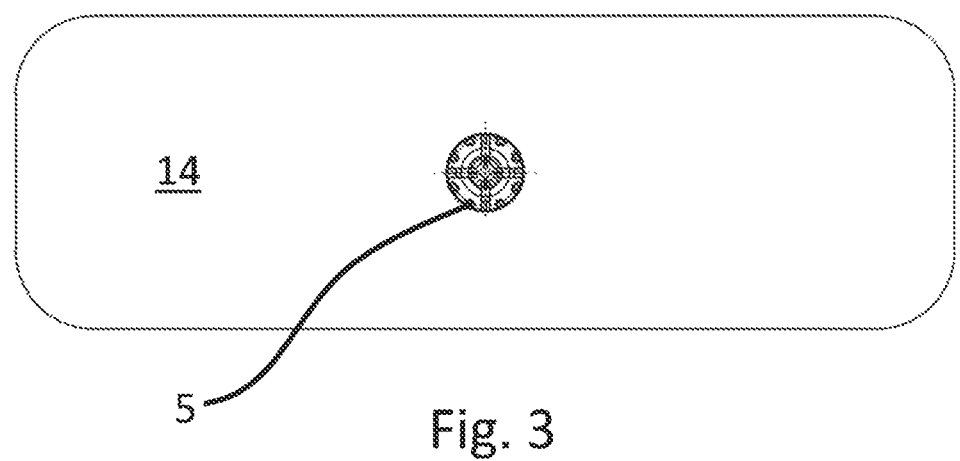
FIG. 3 a plan view from below onto a catching means of the carrier apparatus in the mounted state.
Figure 8:
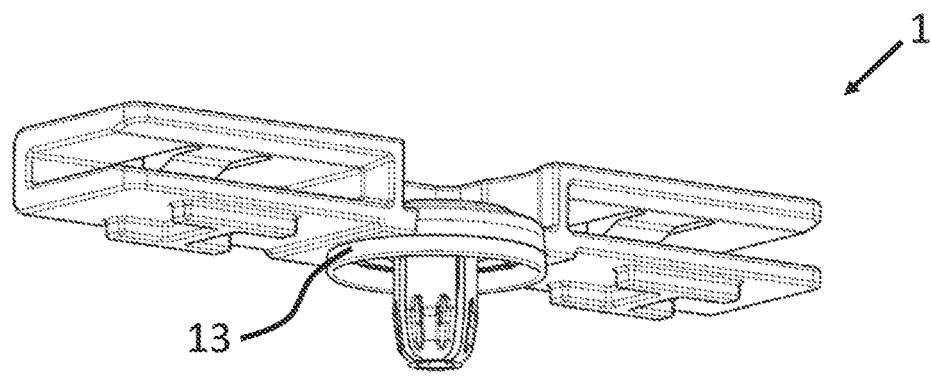
FIG. 8 a further perspective view of the carrier apparatus.

In the following, a carrier apparatus 1 according to the invention is described in more detail on the basis of a first exemplary embodiment (FIGS. 1 to 8).

The carrier apparatus 1 or mount for fastening a water-collecting strip 10 to an A-pillar 14 of a motor vehicle comprises a fastening wall 2.

The fastening wall 2 is approximately plate-shaped and comprises a fastening side 3 and a receiving side 4. According to this exemplary embodiment, the fastening wall 2 comprises two fastening wall portions 19. Each of these have a fastening side portion 20 and a receiving side portion 27.

However, the fastening wall 2 can also be configured continuously.

In the region between the two fastening portions, a catching means 5 extending in the orthogonal direction from the fastening side 3 is arranged in the fastening wall 2. The catching means 5 is configured as an expanding rivet.

On the fastening side 3 of the fastening wall 2, two catching means 5 extending from the fastening side 3 in approximately orthogonal direction can also be arranged.

The catching means 5 are provided in order to be releasably connected to through-openings or fastening openings 17 of an A-pillar 14 of a motor vehicle, said openings being configured in order to correspond to the catching means 5.

Furthermore, the carrier apparatus 1 comprises a fixing wall 6, which is approximately plate-shaped and is arranged approximately parallel to the fastening wall 2, wherein the fixing wall 6 according to this exemplary embodiment comprises two plate-shaped fixing wall portions 22. However, the fixing wall 6 can also be configured continuously.

The fixing wall 6 comprises a fixing side 7, which faces in the direction of the receiving region 11.

Accordingly, the fixing wall portions 22 each comprise a fixing side portion 21, which faces in the direction of the receiving region 11. The water-collecting strip is guided and positioned via the fixing side 7 of the fixing wall 6 or the fixing side portions 21 of the fixing wall portions 22 and the receiving side 4 of the fastening wall 2 or the receiving side portions 27 of the fastening wall portions 19, respectively, upon insertion of a water-collecting strip into the receiving region 11. In the mounted state, a surface of the water-collecting strip abuts the fixing side 7 of the fixing wall 6 and the fixing side portions 21 of the fixing wall portions 22 and is positioned and retained by them.

Adjacent edges of the fastening wall 2 and the fixing wall 6 are connected to one another via a connecting wall 8. The connecting wall 8 is arranged approximately orthogonally to the fastening wall 2 and the fixing wall 6.

The free edges of the fastening wall 2 and the fixing wall 6 lying opposite the connecting wall form a receiving opening 9.

A water-collecting strip 10 is insertable via the receiving opening 9 into a receiving region 11 of the carrier apparatus in an insertion direction 18, which extends approximately orthogonal to the connecting wall 8.

The receiving region 11 is bounded by the fastening wall 2, the connecting wall 8, and the fixing wall 6.

Two catching elements 12 extending into the receiving region 11 are arranged on the fixing wall 6 for releasably fixing a water-collecting strip 10 in the receiving region 11, said catching elements forming a catching element device.

The catching elements 12 are inclined at approximately a 45° angle with respect to the insertion direction 18 starting from the fixing side 7 of the fixing wall 6.

Furthermore, an end of the catching elements connected to the fixing wall 6 is provided in the region of the receiving opening 9 so that corresponding catching edges of the catching elements 12 are provided in the region of the connecting wall 8.

The catching elements 12 are thus formed such that when a water-collecting strip 10 is fixed in the receiving region 11, a lower mounting force is required than the dismounting force that is required to release the water-collecting strip 10 from the receiving region.

On the catching means 5, sealing elements 13, each of which are configured in order to be approximately annular and arranged in a radially circumferential manner, are provided for sealingly connecting to an A-pillar of a motor vehicle.

Figure 9:
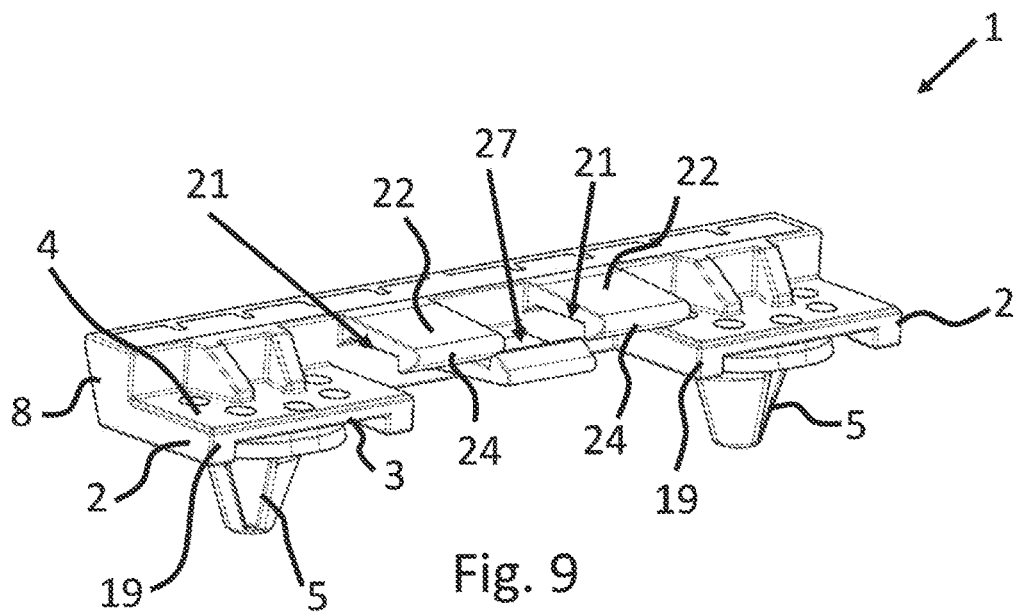
FIG. 9 a perspective view of the carrier apparatus according to the invention according to a second exemplary embodiment.
Figure 10:
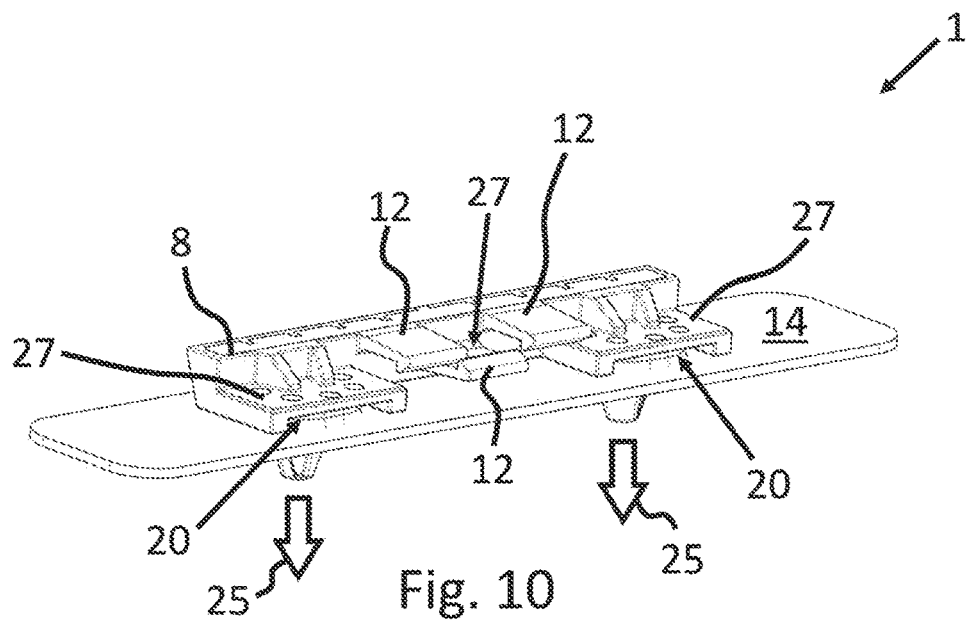
FIG. 10 a further perspective view of the carrier apparatus from FIG. 9 in a state when mounted on an A-pillar.
Figure 11:
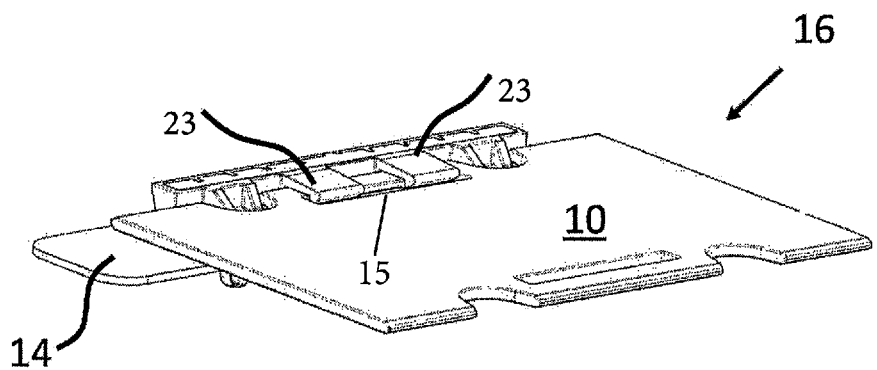
FIG. 11 the view from FIG. 10 with a water-collecting strip mounted on the carrier apparatus.
Figure 12:
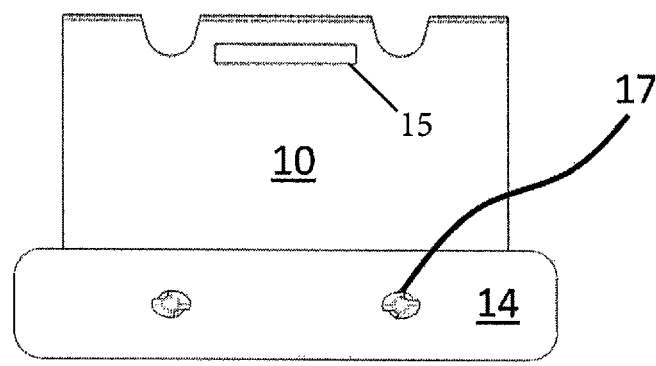
FIG. 12 a plan view from below onto the arrangement from FIG. 12.
Figure 13:
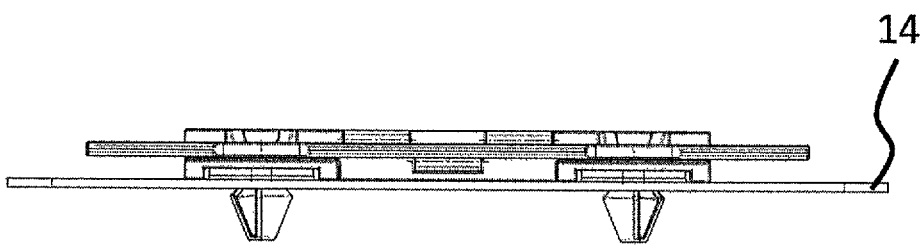
FIG. 13 a lateral view of the arrangement from FIG. 11.
Figure 14:
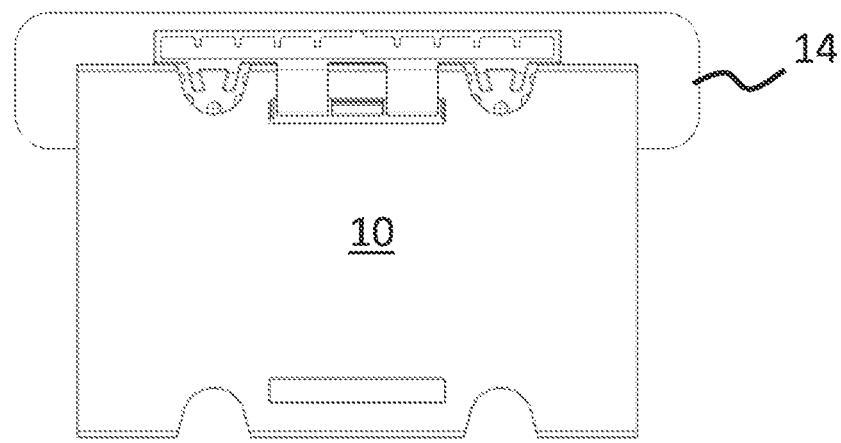
FIG. 14 a plan view from above onto the arrangement from FIG. 11.
Figure 15:
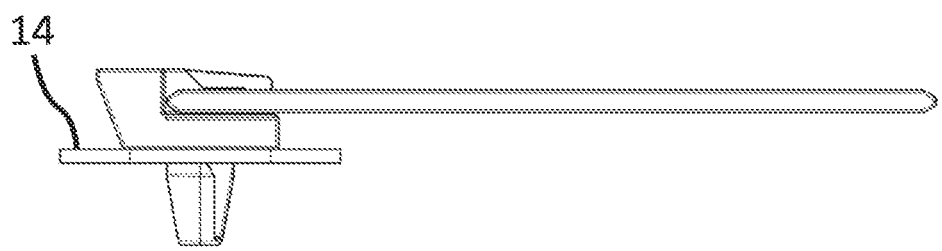
FIG. 15 a lateral view of the arrangement from FIG. 11.
Figure 16:
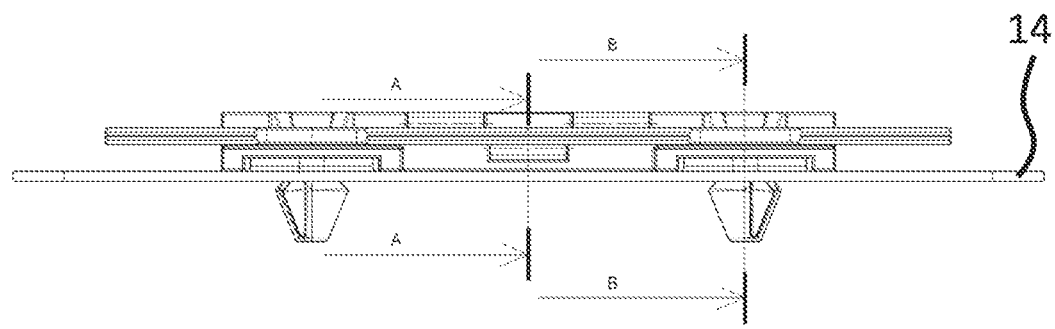
FIG. 16 a further lateral view of the arrangement from FIG. 11.
Figure 17:
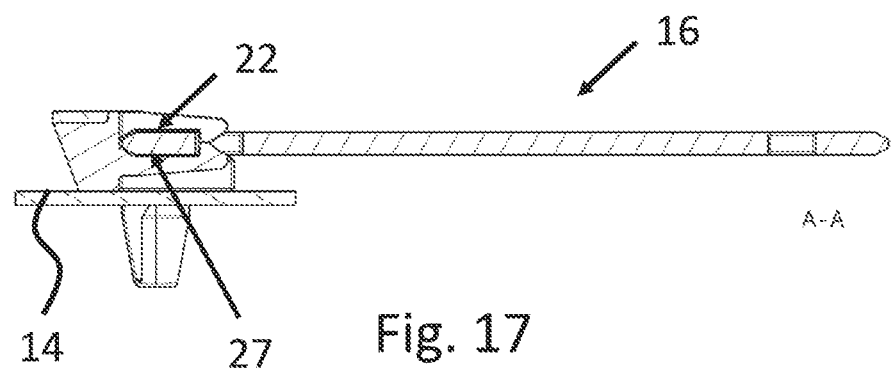
FIG. 17 a laterally cut view of the arrangement from FIG. 16, cut along the line A-A.
Figure 18:
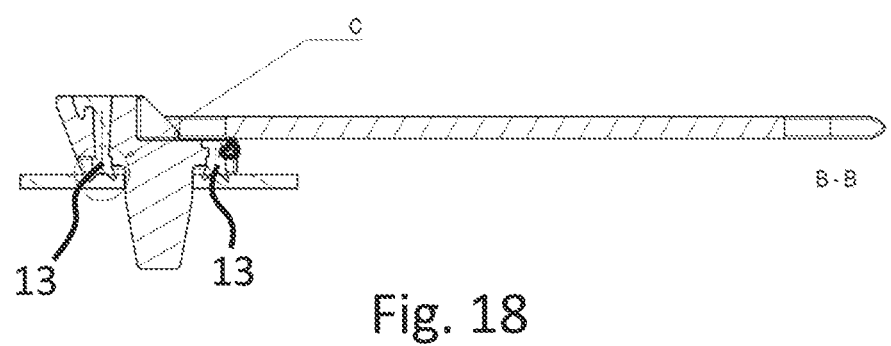
FIG. 18 a laterally cut view of the arrangement from FIG. 16, cut along the line B-B.
Figure 19:
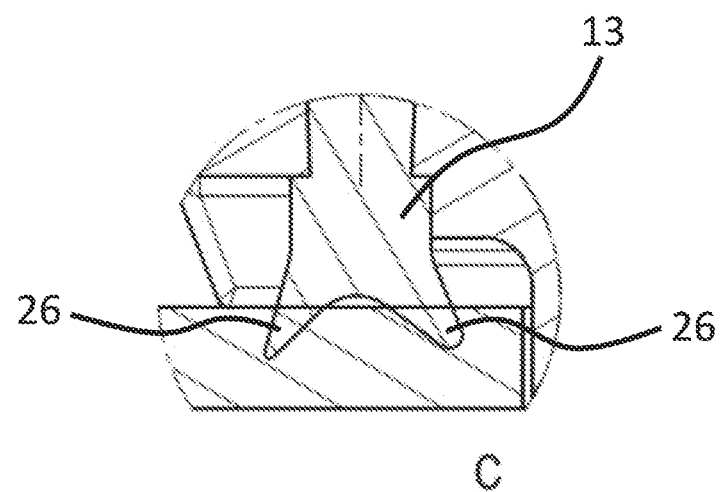
FIG. 19 a detail view from FIG. 18.

In the following, a carrier apparatus 1 according to the invention is described on the basis of a second exemplary embodiment (FIGS. 9 to 19). Unless otherwise described, the carrier apparatus 1 according to the second exemplary embodiment of the invention has the same technical features as the carrier apparatus 1 described above according to the first exemplary embodiment. The same technical features bear the same reference numerals. All technical features of the two exemplary embodiments can be combined as desired with one another, insofar as technically possible.

The carrier apparatus 1 comprises a fastening wall 2. The fastening wall 2 is approximately plate-shaped and comprises a fastening side 3 and a receiving side 4.

According to this exemplary embodiment, the fastening wall 2 comprises two fastening wall portions 19. Each of these have a fastening side portion 20 and a receiving side portion 27.

On the fastening side 3 of the fastening wall 2, two catching means 5 extending in the orthogonal direction from the fastening side are integrally formed. The catching means 5 are provided for releasably connecting to through-openings 17 of an A-pillar 14 of a motor vehicle, said openings being configured in order to correspond to the catching means.

The catching means 5 are formed conically from their free end in the direction of the fastening wall 2 and comprise at least two catching arms with corresponding catching edges, which are configured in order to engage a corresponding fastening opening 17 of an A-pillar. Such catching means are referred to as hard-flex catching means.

The catching means 5 extend accordingly in orthogonal direction from the fastening side portions 20.

The two fastening wall portions 20 are connected to one another via a connecting wall 8.

A first and a second catching element 12 are integrally formed at the free end of the connecting wall 8. The catching elements 12 comprise catching arms, wherein the surfaces of the catching arms facing in the direction of a receiving region 11 form fixing wall portions 22.

At the free ends of the catching arms 23, corresponding catching edges 24 are formed for rearward engagement with a recess or a through-opening of a water-collecting strip. The catching edges extend in the mounting direction 25.

In the region between the two catching elements 12, a further third catching element 12 is provided, which is thus arranged approximately centrally in the region between the two fastening wall portions 19.

The third catching element 12 also comprises a catching arm 23, wherein a surface of the catching arm facing in the direction of the receiving region 11 forms a further receiving side portion 27.

The catching elements 12 form the catching element device.

The catching means 5 comprise a circular annular sealing element 13 in a radially circumferential manner, wherein the sealing element comprises two sealing lips 26 at its free end for the sealing abutment on an A-pillar. The sealing element 13 is produced and connected to the carrier apparatus by means of a 2-component injection molding process.

An assembly 16 according to the invention comprises one of the aforementioned carrier apparatuses 1 above as well as a water-collecting strip 10. Preferably, the assembly 16 comprises three or four carrier apparatuses 1, which are connected to the carrier apparatus 1 via the catching elements 12.

Furthermore, according to the present invention, a method for mounting a carrier apparatus 1 on an A-pillar 14 of a motor vehicle is provided.

The carrier apparatus 1 is moved in a mounting direction 25 in the direction of an A-pillar 14. The catching means 5 are inserted into and rearwardly engage with fastening openings 17 of an A-pillar 14 of a motor vehicle. For this purpose, the fastening openings 17, which are configured in order to correspond to the catching means 5, are provided on an A-pillar of a motor vehicle.

In addition, according to the present invention, a method for mounting a water-collecting strip on a carrier apparatus 1 and thus on an A-pillar 14 of a motor vehicle is provided.

The method comprises the insertion of a water-collecting strip 10 in an insertion direction 18 via a receiving opening 9 into a receiving region 11. The catching elements 12 are locked in catching recesses 15 of the water-collecting strip, which are configured in order to correspond to the catching elements 12.

In this way, an assembly 16 is formed, which comprises three carrier apparatuses 1 as well as a water-collecting strip 10.

LIST OF REFERENCE NUMERALS

1 Carrier apparatus
2 Fastening wall
3 Fastening side
4 Receiving side
5 Catching means
6 Fixing wall
7 Fixing side
8 Connecting wall
9 Receiving opening
10 Water-collecting strip
11 Receiving region
12 Catching element
13 Sealing element
14 A-pillar
15 Catching recess
16 Assembly
17 Fastening opening
18 Insertion direction
19 Fastening wall portion
20 Fastening side portion
21 Fixing side portion
22 Fixing wall portion
23 Catching arm
24 Catching edge
25 Mounting direction
26 Sealing lip
27 Receiving side portion

The invention claimed is:

1. A carrier apparatus for fixing a water-collecting strip to an A-pillar of a motor vehicle, comprising
a fastening wall having a fastening side and a receiving side, wherein at least one catching means is arranged on the fastening side of the fastening wall for releasably connecting with the A-pillar, which catching means extends in an approximately orthogonal direction from the fastening side, and wherein the catching means is formed for insertion and rearward catching in a through-opening of the A-pillar, and
a catching element device arranged opposite the receiving side having at least one catching element for releasably fixing the water-collecting strip in a receiving region, wherein the receiving region is formed between the receiving side of the fastening wall and the catching element;
wherein a catching arm of the catching element forms a fixing wall portion, wherein a catching edge is formed at a free end of the catching arm of the catching element, and wherein the fixing wall portion is arranged spaced apart from and approximately parallel to the fastening wall such that the fixing wall portion and the receiving side bound the receiving region.

2. The carrier apparatus according to claim 1, wherein
the fastening wall comprises two catching means and the catching element device comprises two or three catching elements, wherein the two catching means and the two or three catching elements are arranged offset from one another along a longitudinal direction of the fastening wall.

3. The carrier apparatus according to claim 2, wherein
two catching elements comprise fixing wall portions and catching edges, wherein the third catching element is arranged opposite with respect to the receiving region and whose catching arm forms a receiving side portion, wherein a catching edge is formed at the free end of this catching element.

4. The carrier apparatus according to claim 1 wherein
two adjacent edges of the fastening wall and/or the receiving side portion of the catching elements and the fixing wall portion of the catching element are connected to one another via a connecting wall, wherein the connecting wall is arranged orthogonally to the fastening wall and/or the receiving side portion of the catching element and to the fixing wall portion of the catching element;
and wherein a receiving opening is formed by free edges of the fastening wall and the fixing wall portion lying opposite the connecting wall, which opening opens to the receiving region, wherein the water-collecting strip is insertable into the receiving region in an insertion direction that extends orthogonally to the connecting wall.

5. The carrier apparatus according to claim 1, wherein the catching means comprises a radially circumferential sealing element.

6. An assembly comprising the carrier apparatus according to claim 1 and the water-collecting strip arranged in the receiving region of the carrier apparatus and fixed by the at least one catching element, wherein the water-collecting strip comprises a catching recess formed correspondingly to the catching element of the carrier apparatus.

7. The assembly according to claim 6, further comprising at least a second carrier apparatus according to claim 1 and a third carrier apparatus according to claim 1, each of the second carrier apparatus and the third carrier apparatus engaged with the water-collecting strip.

8. A carrier apparatus for fixing a water-collecting strip to an A-pillar of a motor vehicle, comprising
   a fastening wall having a fastening side and a receiving side, wherein at least one catching means is arranged on the fastening side of the fastening wall for releasably connecting with the A-pillar, which catching means extends in an approximately orthogonal direction from the fastening side, and wherein the catching means is formed for insertion and rearward catching in a through-opening of the A-pillar, and
   a catching element device arranged opposite the receiving side having at least one catching element for releasably fixing the water-collecting strip in a receiving region, wherein the receiving region is formed between the receiving side of the fastening wall and the catching element;
   wherein
   the carrier apparatus comprises a fixing wall having a fixing side, wherein the fixing wall is arranged spaced apart approximately parallel to the fastening wall, and wherein the receiving side of the fastening wall and the fixing side of the fixing wall bound the receiving region, and wherein at least one catching element extending into the receiving region is arranged on the fixing wall for releasably fixing the water-collecting strip in the receiving region.

9. A carrier apparatus for fixing a water-collecting strip to an A-pillar of a motor vehicle, comprising
   a fastening wall having a fastening side and a receiving side, wherein at least one catching means is arranged on the fastening side of the fastening wall for releasably connecting with the A-pillar, which catching means extends in an approximately orthogonal direction from the fastening side, and wherein the catching means is formed for insertion and rearward catching in a through-opening of the A-pillar, and
   a catching element device arranged opposite the receiving side having at least one catching element for releasably fixing the water-collecting strip in a receiving region, wherein the receiving region is formed between the receiving side of the fastening wall and the catching element;
   wherein the fastening wall comprises two catching means and the catching element device comprises two or three catching elements, wherein the two catching means and the two or three catching elements are arranged offset from one another along a longitudinal direction of the fastening wall.

* * * * *